United States Patent Office 2,802,841
Patented Aug. 13, 1957

2,802,841

PROCESS FOR PREPARING CORTICOSTERONE

George B. Spero, Kalamazoo Township, Kalamazoo County, Mich., assignor to The Upjohn Company, Kalamazoo, Mich., a corporation of Michigan No Drawing. Application December 17, 1954, Serial No. 476,063

7 Claims. (Cl. 260—397.45)

This invention relates to a chemical process and is more particularly concerned with a novel process for the preparation of corticosterone from 11-dehydrocorticosterone and with the novel intermediate compounds thus-produced.

The process of the present invention comprises reacting 11-dehydrocorticosterone with an alkanediol, preferably a vicinal alkanediol, such as an alkane-1,2-diol, or an alkane-1,3-diol containing from two to eight carbon atoms, inclusive, in the presence of an acid catalyst to obtain the corresponding 11-dehydrocorticosterone, 3,20-bis-(alkanediol ketal), reducing the 11-keto group of the thus obtained diketal with a metal hydride, illustratively lithium aluminum hydride, sodium borohydride, lithium borohydride, and the like, and hydrolyzing the thus obtained corticosterone 3,20-bis-(alkanediol ketal) in the presence of an acid, for example, acetic acid, hydrochloric or sulfuric acid. The sequence of reactions may be accomplished either with or without isolation of intermediates.

The reaction sequence is illustratively represented by the formulae below:

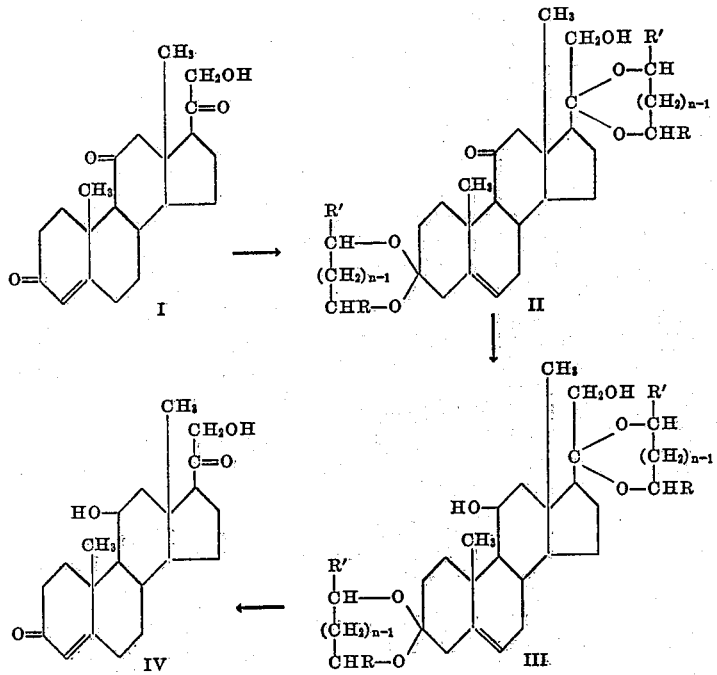

wherein R and R' are selected from the group consisting of hydrogen and lower-alkyl groups such as, for example, methyl, ethyl, propyl, isopropyl, butyl, 1-methylpropyl, amyl, hexyl, and the like, wherein $n$ is an integer from one to two, inclusive, and wherein the total number of carbon atoms in the alkane-dioxy group —O—CHR—(CH$_2$)$_{n-1}$—CHR'—O— is from two to eight inclusive. Of these compounds, the lower-alkylene cyclic ketals formed from vicinal alkanediols, such as alkane-1,2-diols or alkane-1,3-diols are preferred.

While methods of producing an 11β-hydroxy group from an 11-keto group in a steroid are known, the present invention is a superior commercial method for the production of corticosterone. Bernstein et al., U. S. Patent 2,622,081 and 2,666,069, both filed December 4, 1951, produced hydrocortisone from cortisone in a similar manner but in very low yields. Recalculation in Bernstein's three step process as disclosed in the above-mentioned patents showed a yield of only four percent of hydrocortisone. Antonucci, Bernstein et al., J. Org. Chem. 18, 70 (1953) show hydrocortisone was obtained in 17.9 percent yield by the three step process from cortisone, while by combining the last two steps without isolation of the intermediates a yield of nearly twenty percent of hydrocortisone was obtained. A careful repetition of the preparation of hydrocortisone from cortisone carried out under identical conditions with the instant preparation of corticosterone from 11-dehydrocorticosterone by the inventor of the instant process showed a yield of nineteen percent of hydrocortisone (in very good agreement with Bernstein's procedure), while producing 68.9 percent of corticosterone from the starting material, 11-dehydrocorticosterone. Slight changes in the method produce even larger yields of corticosterone. It is obvious that such large differences in yields represent a great commercial advantage.

Corticosterone is an important adrenal cortical hormone, which heretofore was produced by extraction of the adrenal glands. The availability of 11-dehydrocorticosterone from progesterone by such processes as introduction of the 11-keto moiety through bioxidation with the aid of a fungus of the order Mucorales followed by chemical oxidation, and introduction of the 21-oxygen group by the oxalylation process (U. S. Patent 2,683,724 issued July 13, 1954) in combination with the present invention to convert 11-dehydrocorticosterone into corticosterone renders the present invention of utmost importance and usefulness.

It is an object of the present invention to provide a novel process for the preparation of corticosterone from 11-dehydrocorticosterone. Another object of the present invention is to provide a process whereby corticosterone is prepared from 11-dehydrocorticosterone through the intermediate compounds, 11-dehydrocorticosterone 3,20-bis-(alkanediol ketal) and corticosterone 3,20-bis-(alkanediol ketal). Another object of the present invention is to provide a method, through the formation of cyclic ketals, whereby the 3- and 20-keto groups of 11-dehydrocorticosterone are blocked while reduction of the 11-keto group is accomplished. Other objects of the present invention will be apparent to those skilled in the art to which this invention pertains.

In carrying out the process of the present invention, 11-dehydrocorticosterone is admixed, using either order of addition, with at least the theoretical amount of an alkanediol, selected from the group consisting of vicinal alkanediols or alkane-1,3-diol, containing from two to eight carbon atoms, inclusive, in an organic solvent, which is non-reactive under the reaction conditions, e. g. at a temperature between about twenty and about 200 degrees centigrade, preferably between about twenty and about 150 degrees centigrade. Ordinarily, it is preferred to use an excess of the alkanediol, preferably between about five and about fifty moles per mole of the starting steroid. The time required for reaction is not critical and may be varied between about one and about 48 hours, the length of time being dependent on the temperature, the ketalizing reagent and the catalyst employed.

The reaction can be conducted in any organic solvent with which the reactants and products are non-reactive, such as, for example, benzene, toluene, xylene, methylene chloride, petroleum ether, ether, and the like. However, the preferred solvents are those which co-distill with water and hence remove the water as it is formed in the course of the reaction. For this reason the reaction is usually conducted at the reflux temperature of the mixture, such temperature depending, of course, upon the solvent and the particular reaction conditions, e. g., pressure, employed.

The ketal-forming agents of the present invention are alkanediols, preferably vicinal alkanediols such as alkane-1,2-diols, or alkane-1,3-diols, illustratively, ethylene glycol, propane-1,2-diol, propane-1,3-diol, butane-1,2-diol, butane-2,3-diol, butane-1,3-diol, pentane-1,2-diol, pentane-1,3-diol, 3-methylpentane-1,2-diol, hexane-1,3-diol, heptane-1,2-diol, octane-1,2-diol, and the like. The catalyst used in the method of the present invention may be any suitable acid catalyst and is preferably a mineral acid or a benzenesulfonic acid. Representative catalysts are the meta- and para-toluenesulfonic acids, naphthalenesulfonic acid, benzenesulfonic acid, ortho-chlorobenzenesulfonic acid, hydrochloric acid, and sulfuric acid, with benzenesulfonic acids, e. g., para-toluenesulfonic acid, being preferred.

While it is not necessary, it is desirable and preferred to isolate and crudely purify the thus produced 11-dehydrocorticosterone 3,20-diketal. In the preferred embodiment of the present invention this isolation and purification is carried out by conventional means such as by washing the reaction mixture with water to remove the catalyst and excess alkanediol, drying, evaporating the solvent to dryness and recrystallizing the crude 11-dehydrocorticosterone 3,20-bis-(alkanediol ketal) from suitable organic solvents, such as acetone, ethyl acetate, methanol, ethanol, Skellysolve B (a hexane mixture), mixtures thereof, and the like.

In the second step of the method of the present invention, the 11-keto group of 11-dehydrocorticosterone 3,20-bis-(alkanediol ketal) is reduced to an 11β-hydroxy group. In carrying out the reduction, a reducing agent is admixed with 11-dehydrocorticosterone 3,20-bis-(alkanediol ketal) in the presence of an organic solvent which is non-reactive under the conditions of reaction. Reducing agents such as, for example, lithium aluminum hydride, lithium borohydride, sodium borohydride, hydrogen in the presence of a catalyst such as platinum or Raney nickel, and others are operative, with lithium aluminum hydride and sodium borohydride being preferred. Solvents such as, for example, ether, benzene, tetrahydrofuran, dioxane, petroleum ether and others are satisfactory. In the preferred embodiment of the process, lithium aluminum hydride or sodium borohydride is admixed with a suitable organic solvent such as, for example, ether, the steroid is dissolved in a non-reactive solvent such as, for example, ether or tetrahydrofuran, and the admixtures then combined to form the reaction mixture. The temperature of the reaction mixture is usually maintained between about zero and about 100 degrees centigrade, with a temperature between about room temperature and the reflux temperature of the reaction mixture being preferred, for a reaction period varying from about one-half to about eight hours or more. The ratio of reducing agent to starting steroid may be varied considerably over a wide range, a substantial excess of the reducing agent generally being employed with mole-ratios of up to fifty to one and above being operative. After completion of the reaction, the reaction mixture is cautiously treated with water to decompose the excess metal hydrides. The organic layer containing the 11β,21-dihydroxy-5-pregnene-3,20-dione 3,20-bis-(alkanediol ketal) [corticosterone 3,20-bis-(alkanediol ketal)] is separated from the water layer and the solvent is evaporated to yield crude corticosterone 3,20-bis-(alkanediol ketal). In the preferred embodiment of the present invention this material is used without further purification for the final step of the present process, the hydrolysis, to give corticosterone.

In carrying out the hydrolysis, the corticosterone 3,20-bis-(alkanediol ketal) is dissolved in an organic solvent such as, for example, methanol, ethanol, dioxane, acetone, and the like, and this solution is admixed with a hydrolyzing agent. Usually an excess of a dilute aqueous solution of a mineral acid such as sulfuric acid, hydrochloric acid, and the like, is used as the hydrolyzing agent. In some instances acetic acid, other organic acids, and other acidic agents, are suitable. A one to 100-fold excess, or more, of hydrolyzing agent is operative, with a five to ten-fold excess usually being preferred. Usually the reaction mixture is stirred for a period of ten minutes to one hour at the temperature of reflux or for about 24 hours at room temperature. Use of higher concentrations of hydrolyzing agent and higher temperatures usually reduces the reaction period, temperatures between about zero degrees centigrade and about the boiling point of the reaction mixture being operative. The thus obtained corticorsterone is obtained from the reaction mixture by conventional means, such as removal of the solvent by evaporation, extraction and recrystallization as shown in detail in the examples.

The following examples are illustrative of the process and products of the present invention but are not to be construed as limiting.

*Example 1.—11-dehydrocorticosterone 3,20-bis-(ethylene ketal) [21-hydroxy-5-pregnene-3,11,20-trione 3,20-bis-(ethylene ketal)]*

A mixture of 3.44 grams (0.01 mole) of 21-hydroxy-4-pregnene-2,11,20-trione (11-dehydrocorticosterone), 103.2 milligrams of para-toluenesulfonic acid monohydrate (three percent by weight of steroid), 17.2 milliliters of distilled ethylene glycol, and 344 milliliters of benzene were vigorously stirred and allowed to reflux for a period of five hours. The water formed in the reaction was removed by azeotropic distillation. The reaction mixture was then cooled, washed with three 75-milliliter fractions of water to remove the para-toluenesulfonic acid and the ethylene glycol, and evaporated to dryness to give 4,266 grams of crude crystalline 11-dehydrocorticosterone 3,20-bis-(ethylene ketal). This crude material was recrystallized from a fifty percent mixture of acetone and Skellysolve B and gave, in two crops, 3.577 grams of 11-dehydrocorticosterone 3,20-bis-(ethylene ketal) of melting point 202 to 206 degrees. This corresponds to a yield of 82.8 percent.

*Example 2.—11-dehydrocorticosterone 3,20-bis-(propane-1,2-diol ketal)*

In the same manner as given in Example 1, 11-dehydrocorticosterone is heated with propane-1,2-diol in the presence of benzenesulfonic acid to give 11-dehydrocorticosterone 3,20-bis-(propane-1,2-diol ketal).

In the same manner as Examples 1 and 2, other 11-dehydrocorticosterone 3,20-diketals are prepared by reacting 11-dehydrocorticosterone with an alkanediol, preferably a vicinal alkanediol, such as an alkane-1,2-diol, or an alkane-1,3-diol in the presence of an acidic catalyst, such as sulfuric acid, hydrochloric acid, or benzenesulfonic acids. Illustratively such other 11-dehydrocorticosterone-3,20-diketals include: 11-dehydrocorticosterone 3,20-bis-(propane-1,3-diol ketal), 11-dehydrocorticosterone 3,20-bis-(butane-1,2-diol ketal), 11-dehydrocorticosterone 3,20-bis-(butane-2,3-diol ketal), 11-dehydrocorticosterone 3,20-bis-(butane-1,3-diol ketal), 11-dehydrocorticosterone 3,20-bis-(3-methylpentane-1,2-diol ketal), 11-dehydrocorticosterone 3,20-bis-(pentane-1,2-diol ketal), 11-dehydrocorticosterone 3,20-bis-(pentane-1,3-diol ketal), 11-dehydrocorticosterone 3,20-bis-(pentane-2,3-diol ketal), 11-dehydrocorticosterone 3,20-bis-(hexane-1,2-diol ketal), 11-dehydrocorticosterone-3,20-bis-(hexane-1,3-diol ketal), 11-dehydrocorticosterone 3,20-bis-(heptane-1,2-diol ketal), 11-dehydrocorticosterone 3,20-bis-(heptane-2,3-diol ketal), 11-dehydrocorticosterone 3,20-bis-(heptane-1,3-diol ketal), 11-dehydrocorticosterone 3,20-bis-(octane-1,2-diol ketal), 11-dehydrocorticosterone 3,20-bis-(octane-1,3-diol ketal), 11-dehydrocorticosterone 3,20-bis-(octane-2,3-diol ketal), and the like.

*Example 3.—Corticosterone 3,20-bis-(ethylene ketal) [11β,21-dihydroxy-5-pregnene-3,20-dione 3,20-bis-(ethylene ketal)]*

To a suspension of 1.788 grams (one-half the weight of steroid) of lithium aluminum hydride, in 36 milliliters of anhydrous ether, was added 3.577 grams of 11-dehydrocorticosterone 3,20-bis-(ethylene ketal) dissolved in 215 milliliters of tetrahydrofuran. The addition was carried out portionwise with cooling conditions. After all the material had been added the mixture was heated at reflux for a period of one and one-half hours and was then cooled and the excess of lithium aluminum hydride decomposed by the cautious addition of water. A total of 36 milliliters of water was added followed by 175 milliliters of ether. The white precipitate present was removed by filtration. To the filtrate was added 175 milliliters of water and the ether phase was separated. The water phase was then extracted with four 75-milliliter portions of ether and these extracts were added to the main ether phase. After washing with water the ether phase was evaporated to dryness to give 3.437 grams of corticosterone 3,20-bis-(ethylene ketal) in a gelatinous form. This material was not further purified but was immediately used in the next step (cf. Example 5).

*Example 4.—Corticosterone 3,20-bis-(propane-1,2-diol ketal)*

In the manner given in Example 3, 11-dehydrocorticosterone 3,20-bis-(propane-1,2-diol ketal) is refluxed with lithium aluminum hydride in a solution of ether and tetrahydrofuran, and then hydrolyzed with water to yield corticosterone 3,20-bis-(propane-1,2-diol ketal).

In a manner similar to Example 3 and 4, corticosterone diketals may be prepared from 11-dehydrocorticosterone 3,20-bis-(alkanediol ketal) by refluxing the 11-dehydrocorticosterone 3,20-bis-(alkanediol ketal) with a metallic hydride in an inert solvent and decomposing the thus obtained lithium complex. Thus prepared corticosterone diketals include: 11-corticosterone 3,20-bis-(propane-1,3-diol ketal), 11-corticosterone 3,20-bis-(butane-1,2-diol ketal), 11-corticosterone 3,20-bis-(butane-2,3-diol ketal), 11-corticosterone 3,20-bis-(butane-1,3-diol ketal), 11-corticosterone 3,20-bis-(3-methylpentane-1,2-diol ketal), 11-corticosterone 3,20-bis-(pentane-1,2-diol ketal), 11-corticosterone 3,20-bis-(pentane-1,3-diol ketal), 11-corticosterone 3,20-bis-(pentane-2,3-diol ketal), 11-corticosterone 3,20-bis-(hexane-1,2-diol ketal), 11-corticosterone 3,20-bis-(hexane-1,3-diol ketal), 11-corticosterone 3,20-bis-(heptane-1,2-diol ketal), 11-corticosterone 3,20-bis-(heptane-2,3-diol ketal), 11-corticosterone 3,20-bis-(heptane-1,3-diol ketal), 11-corticosterone 3,20-bis-(octane-1,2-diol ketal), 11-corticosterone 3,20-bis-(octane-1,3-diol ketal), 11-corticosterone 3,20-bis-(octane-2,3-diol ketal), and the like.

*Example 5.—Corticosterone*

The crude material obtained in Example 3 [3.437 grams of crude corticosterone 3,20-bis-(ethylene ketal)] was dissolved in 344 milliliters of methanol and thereto was added 34.4 milliliters of an eight and one-half volume percent of sulfuric acid solution. The resulting solution was refluxed for a period of forty minutes, cooled and made neutral with 205 milliliters of dilute sodium bicarbonate solution. At first, a precipitate of inorganic salts formed on addition of the base. The mixture was concentrated on the steam bath under reduced pressure. During this concentration while the methanol was evaporated the inorganic salts went into solution and the organic product started to precipitate. After most of the organic product (corticosterone) had precipitated, the mixture was chilled and filtered to give 2,184 grams of product. The filtrate was extracted with ethyl acetate, washed with water, and evaporated to dryness to give additional 0.552 gram of crude corticosterone. The total yield of corticosterone was 2.385 grams, equal to a yield of 68.9 percent calculated on the basis of the starting material, 11-dehydrocorticosterone, having a melting point of 175 to 182 degrees centigrade.

*Example 6.—Corticosterone*

In the same manner as given in Example 5, corticosterone 3,20-bis-(propane-1,2-diol ketal) was hydrolyzed with a solution of aqueous sulfuric acid and methanol to give corticosterone.

In the manner of Examples 5 and 6, the corticosterone diketals illustratively represented in Examples 3 and 4, may be hydrolyzed in aqueous sulfuric or aqueous hydrochloric acid and methanol, to yield pure corticosterone.

*Example 7*

A solution of one gram of 11-dehydrocorticosterone 3,20-bis-(ethylene ketal), 0.5 gram of sodium borohydride, 15 milliliters of dioxane, previously distilled over sodium borohydride, 2.5 milliliters of water and 0.5 milliliter of one tenth normal sodium hydroxide solution was allowed to reflux for a period of 16 hours. Thereafter, ten milliliters of two normal sulfuric acid was carefully added and the solution allowed to reflux for an additional ten minutes. The reaction mixture was then cooled, poured into ice water, and extracted three times with thirty milliliters of ethyl acetate. The ethyl acetate solution was washed with water, dried over anhydrous sodium sulfate, and evaporated to dryness to give 761 milligrams (95 percent) of product of melting point 170 to 181. The thus-obtained corticosterone was recrystallized from acetone-Skellysolve B (a mixture of hexanes) solution to give 674 milligrams (84 percent) of purified corticosterone of melting point 179 to 183.

In the manner of Example 7, the 11-dehydrocorticosterone 3,20-bis-(alkanediol ketals) shown in Examples 1 and 2, may be reduced with sodium borohydride and hydrolyzed with sulfuric acid as shown in Example 7 to give corticosterone in high yield. The production of corticosterone from 11-desoxycorticosterone by reducing the diketal of 11-dehydrocorticosterone with sodium borohydride produces an overall yield in all the steps involved of about 70 percent.

It is to be understood that the invention is not to be limited to the exact details of operation or exact compounds shown and described, as obvious modifications and equivalents will be apparent to one skilled in the art and the invention is therefore to be limited only by the scope of the appended claims.

I claim:

1. A process for the preparation of corticosterone which comprises: mixing together an alkanediol containing from two to eight carbon atoms, inclusive, and 11-dehydrocorticosterone in the presence of an acid, to obtain 11 - dehydrocorticosterone 3,20 - bis - (alkanediol ketal), treating the 11-dehydrocorticosterone 3,20-bis-(alkanediol ketal) with a metallic hydride selected from the group consisting of lithium aluminum hydride, sodium borohydride and lithium borohydride to produce corticosterone 3,20-bis-(alkanediol ketal), hydrolyzing the thus-produced corticosterone 3,20-bis-(alkanediol ketal) in the presence of an acid and recovering the thus-produced corticosterone.

2. A process for the preparation of corticosterone which comprises: mixing together an alkanediol containing from two to eight carbon atoms, inclusive, and 11-dehydrocorticosterone in the presence of an acid catalyst selected from the group consisting of benzenesulfonic acids and mineral acids to obtain 11-dehydrocorticosterone 3,20-bis-(alkanediol ketal), treating this bisketal with lithium aluminum hydride to produce corticosterone 3,20-bis-(alkanediol ketal), hydrolyzing the thus-produced corticosterone 3,20-bis-(alkanediol ketal) with water in the presence of a solvent and a mineral acid and recovering the thus-produced corticosterone.

3. A process for the preparation of corticosterone which comprises: mixing together ethylene glycol and 11-dehydrocorticosterone in the presence of an acid catalyst selected from the group consisting of benzenesulfonic acids and mineral acids to obtain 11-dehydrocorticosterone 3,20-bis-(ethylene ketal), treating this bisketal with lithium aluminum hydride to produce corticosterone 3,20-bis-(ethylene ketal), hydrolyzing the thus-produced corticosterone 3,20-bis-(ethylene ketal) with water in the presence of a solvent and a mineral acid and recovering the thus-produced corticosterone.

4. A process for the preparation of corticosterone which comprises: mixing together ethylene glycol and 11-dehydrocorticosterone in the presence of para-toluenesulfonic acid to obtain 11-dehydrocorticosterone 3,20-bis-(ethylene ketal), treating this bisketal with lithium aluminum hydride to produce corticosterone 3,20-bis-(ethylene ketal), hydrolyzing the thus-produced corticosterone 3,20-bis-(ethylene ketal) with water in the presence of a solvent and a mineral acid and recovering the thus-produced corticosterone.

5. A process for the preparation of corticosterone which comprises: mixing together ethylene glycol and 11-dehydrocorticosterone in the presence of para-toluenesulfonic acid to obtain 11-dehydrocorticosterone 3,20-bis-(ethylene ketal), treating this diketal with sodium borohydride to produce corticosterone 3,20-bis-(ethylene ketal), hydrolyzing the thus-produced corticosterone 3,20-bis-(ethylene ketal) with water in the presence of a solvent and a mineral acid and recovering the thus-produced corticosterone.

6. A process for the preparation of corticosterone which comprises: mixing together ethylene glycol and 11-dehydrocorticosterone in the presence of para-toluenesulfonic acid to obtain 11-dehydrocorticosterone 3,20-bis-(ethylene ketal), treating this diketal with lithium aluminum hydride to produce corticosterone 3,20-bis-(ethylene ketal), hydrolyzing the thus-produced corticosterone 3,20-bis-(ethylene ketal) with water in the presence of a solvent and sulfuric acid and recovering the thusproduced corticosterone.

7. A process for the preparation of corticosterone which comprises: mixing together ethylene glycol and 11-dehydrocorticosterone in the presence of para-toluenesulfonic acid to obtain 11-dehydrocorticosterone 3,20-bis-(ethylene ketal), treating this diketal with sodium borohydride to produce corticosterone 3,20-bis-(ethylene ketal), hydrolyzing the thus-produced corticosterone 3,20-bis-(ethylene ketal) with water in the presence of a solvent and sulfuric acid and recovering the thus-produced corticosterone.

References Cited in the file of this patent

UNITED STATES PATENTS

| | | |
|---|---|---|
| 2,622,081 | Bernstein | Dec. 16, 1952 |
| 2,666,069 | Bernstein | Jan. 12, 1954 |
| 2,702,291 | Sondheimer | Feb. 15, 1955 |

OTHER REFERENCES

Fieser et al.: Natural Products Related to Phenanthrene, 3rd ed., page 407 (1949)